(12) United States Patent
Friederichs et al.

(10) Patent No.: US 11,427,608 B2
(45) Date of Patent: Aug. 30, 2022

(54) DIHYDROCARBYL-SILYL-BRIDGED-1,3 DISUBSTITUTED-2-INDENYL METALLOCENE COMPLEXES FOR OLEFIN POLYMERIZATION

(71) Applicant: SABIC GLOBAL TECHNOLOGIES B.V., Bergen op Zoom (NL)

(72) Inventors: Nicolaas Hendrika Friederichs, Geleen (NL); Antonio Vittoria, Geleen (NL); Roberta Cipullo, Geleen (NL); Vincenzo Busico, Geleen (NL); Ilya Borisov, Geleen (NL); Bogdan A. Guzeev, Geleen (NL); Dmitry Y. Mladentsev, Geleen (NL); Mikhail I. Sharikov, Geleen (NL); Dmitry Uborsky, Geleen (NL); Alexander Voskoboynikov, Geleen (NL); Hendriksen Coen, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 312 days.

(21) Appl. No.: 16/500,658

(22) PCT Filed: Apr. 4, 2018

(86) PCT No.: PCT/EP2018/058622
§ 371 (c)(1),
(2) Date: Oct. 3, 2019

(87) PCT Pub. No.: WO2018/185170
PCT Pub. Date: Oct. 11, 2018

(65) Prior Publication Data
US 2021/0115080 A1   Apr. 22, 2021

(30) Foreign Application Priority Data
Apr. 4, 2017 (EP) .................... 17164676

(51) Int. Cl.
*C07F 17/00* (2006.01)
*C08F 4/6592* (2006.01)
*C08F 210/16* (2006.01)
*C08F 4/659* (2006.01)
*C08F 10/00* (2006.01)

(52) U.S. Cl.
CPC .......... *C07F 17/00* (2013.01); *C08F 4/65912* (2013.01); *C08F 4/65927* (2013.01); *C08F 10/00* (2013.01)

(58) Field of Classification Search
CPC ..... C07F 17/00; C08F 4/65927; C08F 210/16
See application file for complete search history.

(56) References Cited

U.S. PATENT DOCUMENTS

| 5,071,808 A | 12/1991 | Antberg et al. |
| 6,232,484 B1 | 5/2001 | Schaverien et al. |
| 6,342,622 B1 | 1/2002 | Arts et al. |
| 6,693,156 B1 | 2/2004 | Resconi |

(Continued)

FOREIGN PATENT DOCUMENTS

| EP | 1132421 A2 | 9/2001 |
| EP | 1153944 A1 | 11/2001 |

(Continued)

OTHER PUBLICATIONS

Christopher J. et al., Synthesis and Structures of rac-Me2Si(è5-1-indenyl)2Hf(NMe2)2 and {Me2Si(è5-1-indenyl)(è3-2-indenyl)}Hf(NMe2)2, Organometailics, 1997, 16, 3044-3050.

(Continued)

*Primary Examiner* — Caixia Lu
(74) *Attorney, Agent, or Firm* — Cantor Colburn LLP

(57) ABSTRACT

The invention relates to a metallocene complex according to formula (A): wherein R1 is selected from C1-C10 alkyl, C6-C20 aryl, C7-C20 aralkyl groups, and C1-C10 alkoxy groups, wherein R2 is selected from H, C1-C10 alkyl; wherein R3-R6, R10 are independently selected from H, C1-C10 alkyl, C6-C10 aryl, and wherein R3 and R4, R4 and R5, or R5 and R6 can be connected to form a ringstructure; wherein M is selected from Ti, Zr and Hf, X is an anionic ligand to M, z is the number of X groups and equals the valence of M minus 2, and wherein each R7 independently is selected from C1-C6 alkyl or aryl groups. The invention also relates to a catalyst comprising the reaction product of the metallocene complex and a cocatalyst. Further the invention relates to a (co)polymerization process of olefinic monomers.

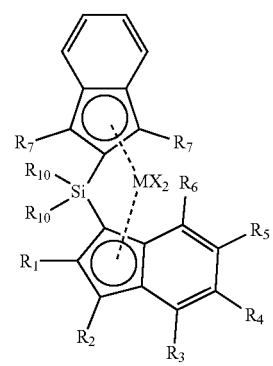

(A)

20 Claims, No Drawings

(56) References Cited

U.S. PATENT DOCUMENTS

| | | | |
|---|---|---|---|
| 6,800,706 | B1 | 10/2004 | Kanamaru et al. |
| 9,000,200 | B2 | 4/2015 | Al-Humydi et al. |
| 9,156,929 | B2 | 10/2015 | Al-Shammari et al. |
| 9,938,360 | B2 | 4/2018 | Vadake Kulangara et al. |
| 10,005,858 | B2 | 6/2018 | Al-Shammari et al. |
| 2003/0104928 | A1 | 6/2003 | Holtcamp |
| 2014/0179884 | A1 | 6/2014 | McCullough |
| 2015/0119539 | A1 | 4/2015 | McCullough |
| 2020/0115478 | A1* | 4/2020 | Friederichs ............ C07F 17/00 |

FOREIGN PATENT DOCUMENTS

| | | |
|---|---|---|
| JP | 8127612 A | 5/1996 |
| JP | 2001220404 A | 8/2001 |
| JP | 2001302687 A | 10/2001 |
| WO | 9411406 A1 | 5/1994 |
| WO | 2014099303 A1 | 6/2014 |
| WO | 2014099307 A1 | 6/2014 |
| WO | 2015065681 A1 | 5/2015 |
| WO | 20180185173 A1 | 10/2018 |

OTHER PUBLICATIONS

Kashimura, T. et al.; Transition metal compounds, there olefin polymerization catalysts, polymerization of olefins using the same, and high-molecular-weight polyolefins therefrom, JPN. Kokai Tokkyo Koho, 18 pp. 2001, English abstract.

Lewkebandara, et al., Adducts of titanium tetrachloride with organosulfur compounds. Crystal and molecular structures of TiCl4(C4H8S)2 and (TiCl4)2(CH3SSCH3), Polyhedron, 1998, vol. 17, No. 1, pp. 1-9.

Nantz et al., Synthesis of [Ethylene-1-(n5-4,5,6,7-tetrahydro-1-indenyl)-2-(n5-4',5',6',7'-tetrahydro-2'-indenyl)]titanium Dichloride, the Elusive Isomer of the Brintzinger-Type, Journal of Organic Chemistry 2003, 68, 8447-8452.

Peacock Andrew J., "Handbook of Polyethylene", Chapters Production Processes, 2000, Marcel Dekker, Inc., New York; ISBN 0824795466; p. 43-66.

Randall, "A Review of High Resolution Liquid 13Carbon Nuclear Magnetic Resonance Characterizations of Ethylene-Based Polymers" Rev. Macromol. Chem. Phys., C.29, V. 2 & 3, 1989, 16 pages.

Rudin, "Practical Aspects of Molecular Weight Measurements" Modern Methods of Polymer Characterization, John Wiley & Sons, New York (1991) pp. 103-112.

Sassmannshausen, Chemistry of Half-Sandwich Compounds of Zirconium: Evidence for the Formation of the Novel ansa Cationic-Zwitterionic Complex [Zr(n:n-C5H4CMe2C6H4Me-p)(u-MeB(CbF5)3)]+[MeB(C6F5)3], Organometailics, 2000, vol. 19, pp. 482-489.

Seenivasan, et al., "Spectroscopic investigation of Heterogeneous Ziegler-Natta Catalysts: Ti and Mg Chloride Tetrahydrofuranates, Their Interaction Compound, and the Role of the Activator", Chemistry—a European Journal, 2011, vol. 17, pp. 8648-8656.

Waymouth et al., "Investigation of Bridge and 2-Phenyl Substituent Effects on Ethylene/ a-Olefin Copolymerization Behavior with 1 2'-Bridged Bis(indenyl)zirconium Dichlorides", Macromolecules 2004, 37, 2342-2347.

Zimm et al.; "The Dimensions of Chain Molecules Containing Branches and Rings"; J. Chem. Phys. 17; 1949; pp. 1301-1314.

International Search Report and Written Opinion of International Application No. PCT/EP2018/058622, International Filing Date Apr. 4, 2018, dated Jun. 12, 2018, 12 pages.

International Search Report and Written Opinion of International Application No. PCT/EP2018/058625, International Filing Date Apr. 4, 2018, dated Jun. 8, 2018, 13 pages.

* cited by examiner

DIHYDROCARBYL-SILYL-BRIDGED-1,3 DISUBSTITUTED-2-INDENYL METALLOCENE COMPLEXES FOR OLEFIN POLYMERIZATION

CROSS REFERENCE TO RELATED APPLICATIONS

This application is a National Stage application of PCT/EP2018/058622, filed Apr. 4, 2018, which claims the benefit of European Application No. 17164676.3, filed Apr. 4, 2017, both of which are incorporated by reference in their entirety herein.

The invention relates to 2-indenyl metallocene complexes, a catalyst comprising a 2-indenyl metallocene complex, a process for the preparation of olefin polymers in the presence of 2-indenyl metallocene complexes, the use of the olefin polymers for making articles and articles comprising an olefin polymer.

Metallocene complexes together with a cocatalyst form catalysts that are widely used for olefin polymerization. In general, the metallocene complexes are known to have only one active polymerization center and are often referred to as single site catalysts or discrete catalysts to distinguish them from non-single site catalysts like for instance Ziegler-type catalysts. The presence of one active center is believed to result in polymers having a narrow molecular weight distribution (MWD) and narrow compositional distribution for copolymers of different olefins. An advantage of metallocene catalysts is their high activity and well defined structures compared to traditional Ziegler-Natta catalysts.

Numerous patent application are known describing metallocene catalysts. For example, WO2014/099307 describes metallocene catalysts for the polymerization of ethylene to branched polyethylene using A catalyst containing the metallocene system dimethylsilylene(2,3,4,5-tetramethyl-1-cyclopentadienyl)(3-phenyl-1-indenyl)zirconium dichloride.

EP0372414 discloses a metallocene catalyst with a ethylene bridged 1-indenyl 2-indenyl zirconium complex.

WO94/11406 discloses 2-indenyl complexes for olefin polymerization.

WO2015/065681 describes a 1-indenyl bridged catalyst system.

Macromolecules 2004, 37, 2342-2347 (Reybuck and Waymouth) describes an investigation of bridge and 2-phenyl substituent effects on ethylene-alfa olefin copolymerization behavior with 1,2'-bridged bis (indenyl) zirconium complexes.

Journal of Organic Chemistry 2003, 68, 8447-8452 (Michael H. Nantz et al.) describes the synthesis of titanium based compounds containing a 2-indenyl moiety linked via an ethylene bridge to a 1-indenyl moiety.

JP2001302687A describes dimethylsilylene-(1-(2-alkyl-4,5-benzoindenyl), (2-indenyl) zirconium dichloride, where the alkyl is methyl, ethyl or butyl.

Despite all efforts, there is a need for a highly active catalyst, which is able to produce polyolefins in a high yield, having a high reactivity for alfa olefin incorporation (like for example copolymerization of ethylene with 1-hexene) and which is still giving high molecular weight polymers.

A new family of metallocene complexes has now been discovered which advantageously can be used for olefin polymerization, preferably for ethylene copolymerization, and which gives at least one advantage of a higher catalyst activity, a higher 1-hexene incorporation and/or a high molecular weight polymer.

SUMMARY OF THE INVENTION

The invention relates to a metallocene complex according to formula (A):

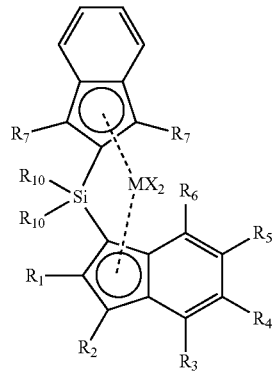

wherein R1 is selected from C1-C10 alkyl, C6-C20 aryl, C7-C20 aralkyl groups, and C1-C10 alkoxy groups, wherein R2 is selected from H, C1-C10 alkyl, or C6-C10 aryl, preferably from H or C1-C10 alkyl;

wherein R3-R6, R10 are independently selected from H, C1-C10 alkyl, C6-C10 aryl, and wherein R3 and R4, R4 and R5, or R5 and R6 can be connected to form a ringstructure; wherein M is selected from Ti, Zr and Hf, X is an anionic ligand to M, and wherein each R7 independently is selected from C1-C6 alkyl or aryl groups.

In particular, the invention relates to a metallocene complex according to formula I,

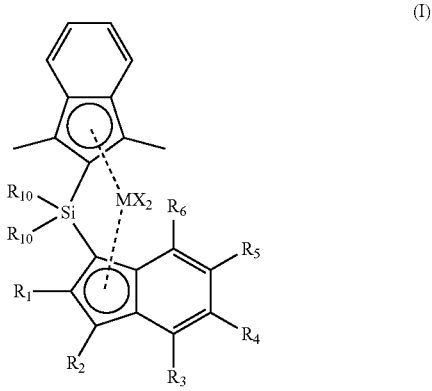

wherein R1 is selected from C1-C10 alkyl, C6-C20 aryl, C7-C20 aralkyl groups, and C1-C10 alkoxy groups, wherein R2 is selected from H, C1-C10 alkyl;

wherein R3-R6, R10 are independently selected from H, C1-C10 alkyl, C6-C10 aryl, and wherein R3 and R4, R4 and R5, or R5 and R6 can be connected to form a ringstructure; wherein M is selected from Ti, Zr and Hf, X is an anionic ligand to M, z is the number of X groups and equals the valence of M minus 2.

The metallocene complex according to the invention surprisingly can copolymerize ethylene with alfa olefins in a high yield with a very high 1-hexene incorporation, and a very high molecular weight. This copolymerization can take place in the presence of a cocatalyst and under suitable polymerization conditions.

DETAILED DESCRIPTION

The metallocene complex according to the present invention has the general structure to formula (A):

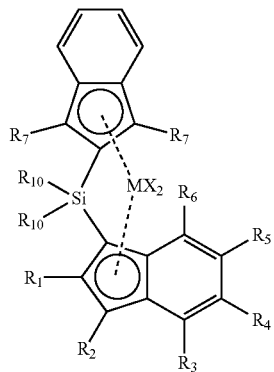

wherein R1 is selected from C1-C10 alkyl, C6-C20 aryl, C7-C20 aralkyl groups, and C1-C10 alkoxy groups, wherein R2 is selected from H, C1-C10 alkyl, or C6-C10 aryl, preferably from H or C1-C10 alkyl;

wherein R3-R6, R10 are independently selected from H, C1-C10 alkyl, C6-C10 aryl, and wherein R3 and R4, R4 and R5, or R5 and R6 can be connected to form a ringstructure; wherein M is selected from Ti, Zr and Hf, X is an anionic ligand to M, and wherein each R7 independently is selected from C1-C6 alkyl or aryl groups.

Both R7 groups may be the same, or they may be different. For example, both R7 groups may be the same. For example, each R7 may individually be a methyl, ethyl, n-propyl, isopropyl, n-butyl, isobutyl, sec-butyl, tert-butyl, n-pentyl, sec-pentyl, isopentyl, neopentyl, cyclopentyl, n-hexyl, sec-hexyl, tert-hexyl, isohexyl, neohexyl, cyclohexyl, or phenyl group. For example, each R7 may individually be a methyl, ethyl, isopropyl or phenyl group. For example, both R7 may be the same and selected from a methyl, ethyl, n-propyl, isopropyl, n-butyl, isobutyl, sec-butyl, tert-butyl, n-pentyl, sec-pentyl, isopentyl, neopentyl, cyclopentyl, n-hexyl, sec-hexyl, tert-hexyl, isohexyl, neohexyl, cyclohexyl, or phenyl group. For example, both R7 may be the same and selected from a methyl, ethyl, isopropyl or phenyl group. For example, both R7 may be methyl. For example, one R7 may be methyl and the other R7 may be phenyl.

In a particular embodiment, the metallocene complex according to the present invention has the general structure according to formula I:

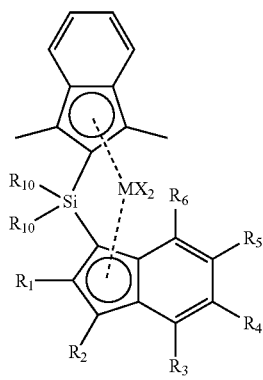

wherein R1 is selected from C1-C10 alkyl, C6-C20 aryl, C7-C20 aralkyl groups, C1-C10 alkoxy groups, wherein R2 is selected from H, C1-C10 alkyl;

wherein R3-R6, R10 are independently selected from H, C1-C10 alkyl, C6-C10 aryl, and wherein R3 and R4, R4 and R5, or R5 and R6 can be connected to form a ringstructure; wherein M is selected from Ti, Zr and Hf, X is an anionic ligand to M, z is the number of X groups and equals the valence of M minus 2.

Preferably M is zirconium or hafnium, most preferably M is zirconium.

Preferably M is connected to 2 monovalent anionic groups, selected from the group consisting of halogen (F, Cl, Br or I), a C1-C20 hydrocarbyl group or a C1-C20 alkoxy group. Preferably X is a methyl group, Cl, Br or I, most preferably methyl or Cl.

The metallocene complex according to formula (I) comprises a 1,3 dimethyl substituted 2-indenyl group which is bridged through a dihydrocarbyl-silyl bridge to a 1-indenyl group, which is substituted with one or more substituents. The hydrocarbyl groups R10 can be a C1-C10 alkyl or C6-C10 arylgroups. Preferably R10 is a methyl group.

Examples of C1-C10 alkyl groups are methyl, ethyl, n-propyl, iso-propyl, n-butyl, isobutyl, tert.butyl and cyclohexyl groups.

Examples of aralkyl groups are substituted or unsubstituted benzyl groups.

Examples of aryl groups are substituted or unsubstituted phenyl, naphthyl groups, like for example phenyl, napthyl, 3,5-dialkyl-1-phenyl, 3,5-dimethyl-1-phenyl, 3,5-diethyl-1-phenyl, 3,5-diisopropyl-1-phenyl or 3,5-ditertiairbutyl-1-phenyl.

In a preferred embodiment R1 is selected from methyl, ethyl, propyl, isopropyl, butyl, isobutyl, phenyl, 3,5-dialkyl-1-phenyl, preferably 3,5-dimethyl-1-phenyl, 3,5-diethyl-1-phenyl, 3,5-diisopropyl-1-phenyl or 3,5-ditertiairbutyl-1-phenyl.

Preferably R2 is H.

Preferably R3 is H, a C1-C4 alkyl group, a C6-C10 aryl group or a hydrocarbon ring together with R4. Most preferably R3 is H, methyl, ethyl, propyl, isopropyl, phenyl, or forms a ringstructure together with R4 and the carbon atoms of the indenyl ring which are coupled to R3 and R4. Most preferably R3 is chosen from H, a methyl group, a phenyl group or part of a 6 membered aromatic ringstructure.

Preferably R4 is H, a C1-C4 alkyl group, a C6-C10 aryl group or a hydrocarbon ring together with R3. More preferably R4 is H, or forms a ringstructure together with R3 and the carbon atoms of the 1-indenyl group to which R3 and R4 are attached.

Preferably R5 and R6 are each independently H, or a C1-C4 alkyl group, more preferably H or a methyl group.

In a preferred embodiment of the present invention, it has been found that metallocene complexes (II), when used in ethylene-hexene copolymerizations, show unexpected high reactivity for hexene, resulting in high hexene incorporation, while also the molecular weight of the copolymers obtained is very high.

In one embodiment of the invention, the metallocene complex according to the present invention preferably has a structure (II):

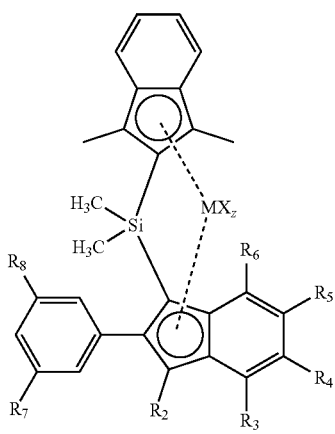

(II)

Preferably R2 is selected from H and C1-C10 alkyl groups, and R3, R4, R5 and R6 are independently selected from H, C1-C10 alkyl, and C6-C20 aryl, and wherein R3 and R4, R4 and R5, or R5 and R6 can be connected to form a ringstructure. R7 and R8 preferably are selected from H and C1-C10 alkyl groups.

In a most preferred embodiment of the invention the metallocene is according to formula (II), wherein R2 is H, R7 and R8 are chosen from H, methyl, isopropyl or tertiair butyl R3-R6 are chosen from H, a methyl group, a phenylgroup and/or R3 and R4 form a six membered ring structure.

Z is the number of X groups and equals the valence of M minus 2.

In a second embodiment of the invention, the metallocene complex according to the present invention preferably has structure (III),

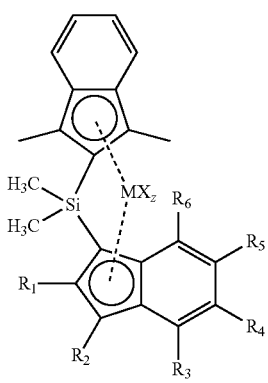

(III)

wherein R1 is chosen from methyl, ethyl, propyl, isopropyl, and R3-R6 are chosen from H, a methyl group, a phenyl-group and/or R3 and R4 form a six membered ring structure; most preferably R1 is chosen from methyl, ethyl, propyl, isopropyl and R3 is chosen from H, a methyl group, a phenylgroup, R4-R6 are H and/or R3 and R4 form a six membered ring structure.

Support

The metallocene complex can be immobilized on a support. The support is preferably an inert support, more preferably a porous inert support. Examples of porous inert supports materials are talc, clay and inorganic oxides. Preferably, the support material is in a finely divided form.

Suitable inorganic oxide materials include group 2A, 3A, 4A and 4B metal oxides such as silica, alumina and mixtures thereof. Other inorganic oxides that may be employed either alone or in combination with the silica or alumina are magnesia, titania, zirconia and the like. Other support materials, however, can be employed, for example finely divided functionalized polyolefins such as finely divided polyethylene.

Preferably, the support is a silica having a surface area between 200 and 900 $m^2/g$ and a pore volume between 0.5 and 4 ml/g.

Catalyst

The invention is also directed to a catalyst prepared from the metallocene complex according to the invention and a cocatalyst. The cocatalyst should be capable to generate a cationic specie from the metallocene compound and form a so-called non- or weakly coordinating anion. Suitable cocatalysts include aluminium- or boron-containing cocatalysts. Suitable aluminium-containing cocatalysts comprise aluminoxanes, alkyl aluminium compounds and aluminium-alkyl-chlorides. The aluminoxanes usable according to the present invention are well known and preferably comprise oligomeric linear and/or cyclic alkyl aluminoxanes represented by the formula: $R^3—(AlR^3—O)_n—AlR^3{}_2$ for oligomeric, linear aluminoxanes and $(—AlR^3—O—)_m$ for oligomeric, cyclic aluminoxanes; wherein n is 1-40, preferably n is 10-30; m is 3-40, preferably m is 3-30 and $R^3$ is a $C_1$ to $C_8$ alkyl group and preferably a methyl group. Further other organoaluminum compounds can be used such as trimethylaluminum, triethylaluminium, triisopropylaluminum, tri-n-propylaluminum, triisobutylaluminum, tri-n-butylaluminium, triamylaluminium; dimethylaluminium ethoxide, diethylaluminium ethoxide, diisopropylaluminium ethoxide, di-n-propylaluminium ethoxide, diisobutylaluminium ethoxide and di-n-butylaluminium ethoxide; dimethylaluminium hydride, diethylaluminium hydride, diisopropylaluminium hydride, di-n-propylaluminium hydride, diisobutylaluminium hydride and di-n-butylaluminium hydride.

Suitable boron-containing cocatalysts include trialkylboranes, for example trimethylborane or triethylborane and/or perfluoroarylborane and/or perfluoroarylborate-compounds.

In the process to produce olefin polymers by polymerizing one or more olefins in the presence of a metallocene complex preferably an organoaluminum cocatalyst is present.

More preferably, methylaluminoxane, trialkylboranes, perfluoroarylboranes or perfluoroarylborates are used as the cocatalyst.

Olefin Polymerization

In another aspect, the invention relates to a process for the preparation of olefin polymers by polymerizing one or more olefins in the presence of a cocatalyst and the metallocene complex of the invention, wherein the metallocene complex optionally is immobilized on a support.

The process to produce the olefin polymers may start with the reaction of the metallocene complex according to the invention with the cocatalyst. This reaction can be performed in the same vessel as the reaction vessel wherein the olefin polymers are produced or in a separate vessel, whereafter the mixture of the metallocene complex and the cocatalyst is fed to the reaction vessel. During the reaction described above an inert solvent can be used.

The polymerization, can be adequately carried out in a slurry process, a solution process or a gasphase process.

In the mixture of the metallocene complex and an organoaluminium cocatalyst, the cocatalyst is used in an amount of 10 to 100,000 mol, preferably from 10 to 10,000 mol per mol of the transition metal compound.

In the mixture of the metallocene complex and an organoborane or organoborate cocatalyst, the cocatalyst is used in an amount of 0.1 to 100 mol, preferably from 0.5 to 100 mol per mol of the transition metal compound.

The solvent used in a slurry process to produce olefin polymers may be any organic solvent usually used for the polymerization. Examples of solvents are benzene, toluene, xylene, propane, butane, pentane, hexane, heptane, cyclohexane and methylene chloride. Also the olefin to be polymerized can be used as the solvent.

In the process to produce olefin polymers the polymerization conditions, like for example temperature, time, pressure, monomer concentration can be chosen within wide limits. The polymerization temperature is in the range from −100 to 300° C., preferably 0 to 200° C., more preferably 50 to 200° C. The polymerization time is in the range of from 10 seconds to 20 hours, preferably from 1 minute to 10 hours, more preferably from 5 minutes to 5 hours. The ethylene pressure during polymerization is in the range from 1 to 3500 bar, preferably from 1 to 2500 bar, more preferably from 1 to 1000 bar, even more preferably from 1 to 500 bar, most preferably from 1 to 100 bar. The molecular weight of the polymer can be controlled by use of hydrogen in the polymerization. The polymerization may be conducted by a batch process, a semi-continuous process or a continuous process and may also be conducted in two or more steps of different polymerization conditions. The polyolefin produced is separated from the polymerization solvent and dried by methods known to a person skilled in the art.

In the process to produce olefin polymers the olefin which is polymerized can be one type of olefin or can be mixtures of different olefins. The polymerization thus includes homopolymerization and copolymerization. Examples of olefins are α-olefins such as ethylene, propylene, 1-butene, 1-pentene, 4-methyl-1-pentene, 1-hexene, 1-octene, 1-nonene, 1-decene; conjugated and non-conjugated dienes such as butadiene, 1,4-hexadiene, 5-ethylidene-2-norbornene, dicyclopentadiene, 4-methyl-1,4-hexadiene and 7-methyl-1,6-octadiene; cyclic olefins such as cyclobutene and other olefinic compounds such as isobutene, vinyl-cyclohexane and styrene but is not limited thereto.

Preferably, at least one of the olefins that is polymerized is ethylene. More preferably, a mixture of ethylene and at least one other α-olefin of 3 or more carbon atoms is polymerized.

Preferably, the other olefin of 3 or more carbon atoms is chosen from 1-butene, 1-hexene, 1-octene or 4-methyl-1-pentene.

Preferably, the olefin comonomer is present in an amount of about 5 to about 50 percent by weight of the ethylene-olefin copolymer, more preferably an amount of from about 7 to about 40 percent by weight of the ethylene α-olefin copolymer.

For example a linear low density polyethylene (LLDPE) having a melt mass flow rate (also known as melt flow index) as determined using ASTM D1238-10 (190° C./2.16 kg) which ranges from 0.5 to 125 g/10 min and a density in the range from 900 kg/m$^3$ to less than 940 kg/m$^3$ as determined using ASTM D1505-10 may be obtained. For example, the density of the LLDPE ranges from about 915 kg/m$^3$ to less than 940 kg/m$^3$, for example between 915 and 925 kg/m$^3$. For example, the melt flow index of the LLDPE ranges from 0.3 to 3 g/10 min, for example from 0.5 to 1.5 g/10 min.

The polymerisation may be performed via a gas phase process, via a slurry process or via a solution process. The production processes of polyethylene are summarised in "Handbook of Polyethylene" by Andrew Peacock (2000; Dekker; ISBN 0824795466) at pages 43-66.

The various processes may be divided into solution polymerisation processes employing homogeneous (soluble) catalysts and processes employing supported (heterogeneous) catalysts. The latter processes include both slurry and gas phase processes.

When carrying out a slurry or gasphase process, a so-called continuity agent or anti-static agent or anti-fouling agent may be added to reactor.

The invention is also directed to a polyolefin, for example polyethylene, preferably high density polyethylene (HDPE) obtainable or obtained by the process of the invention, for example by copolymerizing ethylene and at least one other olefin in the presence of a metallocene complex according to the invention or a composition, wherein the metallocene complex according to the invention is immobilized on a support.

As defined herein, in linear low density polyethylene, the term "linear" means that the polymer is substantially linear, but may contain some long chain branching.

"Long chain branching" (LCB) means a chain length longer than the short chain branch that results from the incorporation of the α-olefin(s) into the polymer backbone. Each long chain branch will have the same comonomer distribution as the polymer backbones and can be as long as the polymer backbone to which it is attached.

As a practical matter, current $^{13}$C nuclear magnetic resonance spectroscopy cannot distinguish the length of a long chain branch in excess of six carbon atoms. However, there are other known techniques useful for determining the presence of long chain branches in ethylene polymers. Two such methods are gel permeation chromatography coupled with a low angle laser light scattering detector (GPC-LALLS) and gel permeation chromatography coupled with a differential viscometer detector (GPC-DV). In addition, melt-rheology, for example determining the behavior of the polymer melt under different shear rates, is frequently used to indicate the presence of long chain branching. The use of these techniques for long chain branch detection and the underlying theories have been well documented in the literature.

See, for example, Zimm, G. H. and Stockmayer, W. H., J. Chem. Phys., 17, 1301 (1949) and Rudin, A., Modern Methods of Polymer Characterization, John Wiley & Sons, New York (1991 pp. 103-112).

It has been found that with the metallocene complex of the invention or with the composition of the invention wherein the metallocene complex of the invention is present on a support, it is possible to produce polyethylene from ethylene and at least one other olefin, for example an olefin having up to 8 carbon atoms, with a high incorporation of the at least one other olefin.

The amount of incorporation of the at least one other olefin, for example an α-olefin in the polyethylene is expressed by the amount of branches per 1000 carbon atoms.

The presence of short chain branching of up to 6 carbon atoms in length can be determined in ethylene polymers by using $^{13}C$ nuclear magnetic resonance (NMR) spectroscopy and is quantified using the method described by Randall (Rev. Macromol. Chem. Phys., C. 29, V. 2 & 3, p. 285-297).

Therefore, the invention also relates to a polyolefin, preferably polyethylene, for example linear low density polyethylene (LLDPE). The low density polyethylene, for example LLDPE, preferably has an amount of branches per 1000 carbon atoms as determined using $^{13}C$ NMR of at least 18, for example of at least 19, for example at least 20 and/or for example at most 30, for example at most 25, for example at most 23, for example at most 21

The number average molecular weight (Mn) of the polyolefin, for example polyethylene, for example LLDPE of the invention may vary between wide ranges and may for example be in the range from 1000 to 200000 Da. For example, the Mn of the polyolefin of the invention may be at least 1500, for example at least 2000, for example at least 20,000, for example at least 50,000 and/or for example at most 150,000, for example at most 110,000, for example at most 100,000, for example at most 70,000 Da.

The weight average molecular weight (Mw) of the polyolefin, for example polyethylene, for example LLDPE of the invention may also vary between wide ranges and may for example be in the range from 1500 to 500000. For example, the Mw of the polyolefin of the invention may be at least 2500, for example at least 10,000, for example at least 50,000, for example at least 100,000 and/or for example at most 400,000, for example at least 350,000, for example at most 300,000, for example at most 250,000.

For purpose of the invention, the Mw and Mn are determined using SEC (Size Exclusion Chromatography) using 1,2,4-trichlorobenzene or o-dichlorobenzene as an eluent, and calibrated using linear polyethylene or polystyrene standards.

The molecular weight distribution (that is Mw/Mn) of the polyolefin of the invention may for example vary from 2 to 5, from 2.1 to 4 or from 2.5 to 3.5.

The polyolefin obtained or obtainable by the process of the invention may be mixed with suitable additives.

Examples of suitable additives for polyethylene include but are not limited to the additives usually used for polyethylene, for example antioxidants, nucleating agents, acid scavengers, processing aids, lubricants, surfactants, blowing agents, ultraviolet light absorbers, quenchers, antistatic agents, slip agents, anti-blocking agents, antifogging agents, pigments, dyes and fillers, and cure agents such as peroxides. The additives may be present in the typically effective amounts well known in the art, such as 0.001 weight % to 10 weight % based on the total composition.

The polyolefins of the invention and compositions comprising said polyolefins may suitably be used for the manufacture of articles. For example, the polyolefins and compositions of the invention may be manufactured into film, for example by compounding, extrusion, film blowing or casting or other methods of film formation to achieve, for example uniaxial or biaxial orientation. Examples of films include blown or cast films formed by coextrusion (to form multilayer films) or by lamination and may be useful as films for packaging, for example as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets.

Therefore, in another aspect, the invention also relates to articles comprising the polyolefins obtainable by the process of the invention.

In yet another aspect, the invention also relates to use of the polyolefins obtainable by the process of the invention for the preparation of articles, for example for the preparation of films.

In yet another aspect, the invention relates to a process for the preparation of articles using the polyolefin according to the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will hereafter be elucidated by way of the following examples, without being limited thereto.

Examples

General Considerations

All manipulations were carried out under an atmosphere of dry, $O_2$-free $N_2$ employing an Innovative Technology glove box and a Schlenk vacuum-line. Tetrahydrofuran (THF), toluene, methylene chloride, hexane and pentane were purified with a Grubbs-type column system manufactured by Innovative Technology and dispensed into thick-walled Schlenk glass flasks equipped with Teflon-valve stopcocks. Pyridine was dried over the appropriate agents and distilled into the same kind of storage flasks. Anhydrous benzene (Alfa, 99.8%, packaged under argon) was purchased and used as received. Deuterated solvents were dried over the appropriate agents, vacuum-transferred into storage flasks with Teflon stopcocks and degassed accordingly ($CDCl_3$, $C_6D_6$ and $CD_2Cl_2$). $^1H$, $^{11}B$, $^{13}C$ and $^{31}P$ NMR spectra were recorded at 25° C. Bruker 400 MHz spectrometers. Chemical shifts are given relative to $SiMe_4$ and referenced to the residue solvent signal ($^1H$, $^{13}C$). $^{11}B$ and $^{31}P$ resonances were referenced externally to ($BF_3.Et_2O$) and 85% $H_3PO_4$, respectively. Chemical shifts are reported in ppm and coupling constants as scalar values in Hz. $ZrCl_4$ $(Me_2S)_2$,[1] $TiCl_4(THF)_2$[2] and $TiCl_4(Me_2S)_2$[3] were prepared as reported in, respectively, Sassmannshausen, J. *Organometallics* 2000, 19, 482-489; Seenivasan, K.; Sommazzi, A.; Bonino, F.; Bordiga, S.; Groppo, E. *Chemistry—a European Journal* 2011, 17, 8648-8656 and Suren Lewkebandara, T.; McKarns, P. J.; Haggerty, B. S.; Yap, G. P. A.; Rheingold, A.

L.; Winter, C. H. *Polyhedron* 1998, 17, 1-9. ZrCl₄(THF)₂ (Strem) was purchased and used as received.

Synthesis of Ligands and Catalyst Precursors.

Chloro(1,3-dimethylinden-2-yl)dimethylsilane

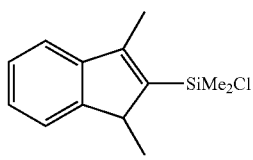

A solution of 1,3-dimethyl-2-bromoindene (50.0 g, 0.224 mol) in ether (1300 ml) was cooled to −80° C. and ᵗBuLi (354 ml 1.9 M in pentane, 0.673 mol) was added. Cooling bath was removed, and the mixture was allowed to warm to 0° C. At that point the double metalation was complete (GC-MS). Then, the mixture was cooled to −80° C., and THF (250 ml) was added followed by chloro(dimethyl)silane, Me₂Si(H)Cl (24.6 ml, 21.2 g, 0.224 mol).

The formed mixture was left in the cooling bath to warm slowly and stirred overnight. Further on, a solution of NH₄Cl was added, the organic phase was separated, washed with water and dried over Na₂SO₄. Solvents were then evaporated in vacuo, and the residue was dissolved in hexane. This solution was passed through a pad of silica gel 60 (40-63 um) to remove 1,3-dimethylinden-2-yl)(ethoxy) dimethylsilane which is one of the side-products. Then, the elute was evaporated in vacuo. The obtained crude (1,3-dimethylinden-2-yl)(dimethyl)silane was then used without isolation in the pure form.

1,3-Dimethylinden-2-yl)(dimethyl)silane, ¹H NMR (CDCl₃): δ 7.46 (m, 1H), 7.38-7.31 (m, 2H), 7.27 (td, J=7.0 Hz, J=1.8 Hz), 4.53 (sept, J=3.9 Hz, 1H), 3.57 (m, 1H), 2.30 (d, J=1.9 Hz, 3H), 1.38 (d, J=7.5 Hz, 3H), 0.39 (d, J=3.9 Hz, 3H), 0.36 (d, J=3.9 Hz, 3H).

The crude (1,3-dimethylinden-2-yl)(dimethyl)silane was dissolved in THF (50 ml), and then hexachloroethane (27 g, 0.111 mol) and PdCl₂ (390 mg, 2.2 mmol) were added. The obtained mixture was stirred overnight at room temperature, then all volatiles were removed in vacuo. The residue was distilled in vacuo, and fraction with b.p. 72° C./2 mbar was collected. This procedure gave 41.0 g (77%) of the title product as a colorless liquid.

¹H NMR (CDCl₃): δ 7.41 (m, 1H), 7.35 (m, 1H), 7.31 (td, J=7.2 Hz, J=1.2 Hz, 1H), 7.26 (td, J=7.1 Hz, J=1.5 Hz, 1H), 3.66 (m, 1H), 2.31 (d, J=2.0 Hz, 3H), 1.38 (d, J=7.5 Hz, 3H), 0.70 (s, 3H), 0.69 (s, 3H).

General Procedure 1. Silylene-Bridged Ligands n-Butyllitium in hexanes (1 equiv) was added dropwise to a solution of the respective indene (1 equiv) in dry ether at room temperature, and the formed mixture was stirred overnight. The desired chlorosilane (1 equiv) was added at −80° C., the obtained mixture was allowed to warm slowly to room temperature and stirred overnight. The resulting mixture was poured into water, the organic layer was separated, and the aqueous layer was extracted with ether. The combined extract was dried over anhydrous sodium sulfate and then evaporated to dryness. The residue was purified by flash chromatography on silica gel 60 (40-64 um) using hexane-dichloromethane mixture (10:1, vol.) as eluent.

General Procedure 2. Complexes n-Butyllithium in hexanes (2 equiv) was added dropwise to a solution of the respective ligand (1 equiv) in ether at room temperature, and the formed mixture was stirred overnight. Then, ZrCl₄ (1 equiv) was added at −80° C., and the obtained mixture was allowed to warm slowly to room temperature and stirred overnight. The resulting mixture was evaporated to dryness, toluene was added to the residue, and the resulting suspension was filtered through a pad of Celite 503 (hot filtration may be necessary in case of a low soluble product). The obtained filtrate was evaporated until the precipitation started. Crystals precipitated from this solution overnight at room temperature were collected, washed with small amount of cold toluene, and then dried in vacuum.

(1,3-Dimethyl-1H-inden-2-yl)(1H-inden-1-yl)dimethylsilane (L92)

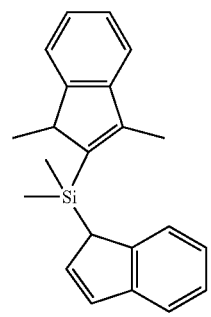 [SMILES: CC1=C([Si](C)(C)C2C=Cc3ccccc32)C(C)c2ccccc21]

According to the general procedure 1, 5.50 g (81%) of the title compound as a ca. 1:1 mixture of the diastereomers A and B was obtained from 2.50 g (21.6 mmol) of 1H-indene in 100 ml of ether, 8.6 ml (21.6 mmol, 2.5 M) of n-butyllithium, and 5.10 g (21.6 mmol) of chloro(1,3-dimethyl-1H-inden-2-yl)dimethylsilane.

¹H NMR (400 MHz, CDCl₃): δ 7.22-7.48 (m, 14H in A and B), 7.14-7.18 (m, 1H in A), 7.08-7.11 (m, 1H in B), 6.93-6.97 (m, 1H in A and 1H in B), 6.68 (dd, J=5.2 Hz, J=1.9 Hz, 1H in B), 6.60 (dd, J=5.2 Hz, J=1.9 Hz, 1H in A), 3.86-3.87 (m, 1H in A and 1H in B), 3.55-3.61 (m, 1H in A and 1H in B), 2.26 (d, J=1.8 Hz, 3H in A), 2.22 (d, J=2.0 Hz, 3H in B), 1.35-1.39 (m, 3H in A and 3H in B), 0.34 (s, 3H in A), 0.24 (s, 3H in B), −0.02 (s, 3H in B), −0.09 (s, 3H in A).

(1,3-Dimethyl-1H-inden-2-yl)(2-phenyl-1H-inden-1-yl)dimethylsilane (L93)

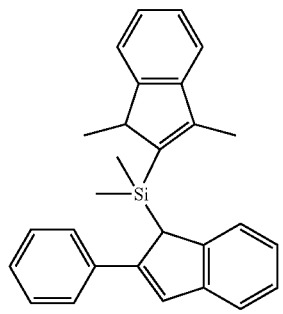 [SMILES: CC1=C([Si](C)(C)C2C(c3ccccc3)=Cc3ccccc32)C(C)c2ccccc21]

According to the General procedure 1, 3.16 g (62%) of the title compound as a ca. 1:1 mixture of the diastereomers A and B was obtained from 2.5 g (13.0 mmol) of 2-phenyl- 1H-indene in 50 ml of dry ether, 5.30 ml (13.0 mmol, 2.5 M) of n-butyllithium and 3.08 g (13.0 mmol) of chloro(1,3-dimethyl-1H-inden-2-yl)dimethylsilane.

$^1$H NMR (400 MHz, CDCl$_3$): δ 6.97-7.56 (m, 28H (in A and B)), 4.41-4.43 (m, 1H (in A), 1H (in B)), 3.43-3.48 (m, 1H (in B)), 2.99-3.05 (m, 1H (in A)), 2.20 (d, 3H (in A), J=1.6 Hz), 2.09 (d, 3H (in B), J=1.6 Hz), 1.34 (d, 3H (in B), J=7.5 Hz), 1.14 (d, 3H (in A), J=7.5 Hz), 0.08 (s, 3H (in A)), 0.04 (s, 3H (in B)), −0.22 (s, 3H (in A)), −0.35 (s, 3H (in B)).

(1,3-Dimethyl-1H-inden-2-yl)(3-phenyl-1H-inden-1-yl)dimethylsilane (L94)

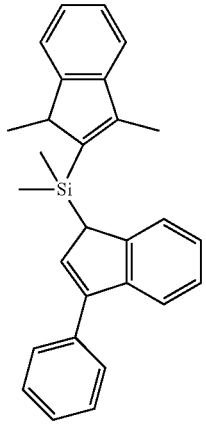 [SMILES: CC1=C([Si](C)(C)C2C=C(c3ccccc3)c3ccccc32)C(C)c2ccccc21]

According to the General procedure 1, 5.45 g (89%) of the title compound as a ca. 1:1 mixture of the diastereomers A and B was obtained from 3.00 g (15.6 mmol) of 1-phenyl-1H-indene 100 ml of dry ether, 6.24 ml (15.6 mmol, 2.5 M) of n-butyllithium and 3.70 g (15.6 mmol) of chloro(1,3-dimethyl-1H-inden-2-yl)dimethylsilane.

$^1$H NMR (400 MHz, CDCl$_3$): δ 7.67-7.71 (m, 1H (in A) and 1H (in B)), 7.60-7.63 (m, 2H (in A) and 2H (in B)), 7.15-7.50 (m, 20H (in A and B)), 6.74 (d, 1H (in A), J=2.0 Hz), 6.67 (d, 1H (in B), J=2.0 Hz), 3.98-3.99 (m, 1H (in A) and 1H (in B)), 3.57-3.64 (m, 1H (in A) and 1H (in B)), 2.32 (d, 3H (in B), J=1.8 Hz), 2.23 (d, 3H (in A), J=2.0 Hz), 1.42 (d, 3H (in A), J=7.5 Hz), 1.37 (d, 3H (in B), J=7.3 Hz), 0.38 (s, 3H (in B)), 0.32 (s, 3H (in A)), 0.04 (s, 3H (in A)), −0.03 (s, 3H (in B)).

(1,3-Dimethyl-1H-inden-2-yl)(2-methyl-1H-inden-1-yl)dimethylsilane (L95)

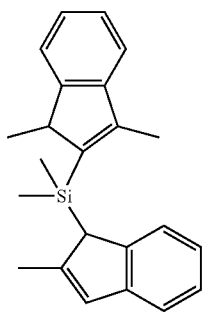 [SMILES: CC1=Cc2ccccc2C1[Si](C)(C)C1=C(C)c2ccccc2C1C]

According to the General procedure 1, 5.49 g (86%) of the title compound as a ca. 1:1 mixture of the diastereomers A and B was obtained from 2.50 g (19.2 mmol) of 2-methyl-1H-indene in 70 ml of dry ether, 7.70 ml (19.2 mmol, 2.5 M) of n-butyllithium and 4.55 g (19.2 mmol) of chloro(1,3-dimethyl-1H-inden-2-yl)dimethylsilane.

$^1$H NMR (400 MHz, CDCl$_3$): δ 7.41-7.45 (m, 2H (in A and B)), 7.10-7.37 (m, 12H (in A and B)), 7.01-7.05 (m, 1H (in A)), 6.92-6.95 (m, 1H (in B)), 6.56-6.58 (m, 2H (in A and B)), 3.70 (s, 1H (in A)), 3.66 (s, 1H (in B)), 3.53-3.60 (m, 2H (in A and B)), 2.31 (d, 3H (in A), J=1.8 Hz), 2.19 (s, 3H (in B)), 2.11 (d, 3H (in B), J=2.0 Hz), 2.01 (s, 3H (in A)), 1.41 (d, 3H (in A), J=7.5 Hz), 1.28 (d, 3H (in B), J=7.5 Hz), 0.34 (s, 3H (in A)), 0.30 (s, 3H (in B)), −0.05 (s, 3H (in B)), −0.11 (s, 3H (in A)).

(1,3-Dimethyl-1H-inden-2-yl)(3-methyl-1H-inden-1-yl)dimethylsilane (L96)

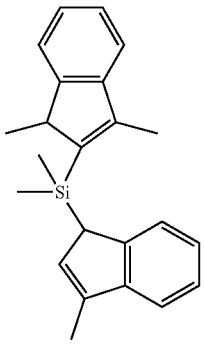 [SMILES: CC1=CC([Si](C)(C)C2=C(C)c3ccccc3C2C)c2ccccc21]

According to the General procedure 1, 4.65 g (73%) of the title compound as a ca. 1:1 mixture of the diastereomers A and B was obtained from 2.50 g (19.2 mmol) of 3-methyl-1H-indene 70 ml of dry ether, 7.70 ml (19.2 mmol, 2.5 M) of n-butyllithium and 4.55 g (19.2 mmol) of chloro(1,3-dimethyl-1H-inden-2-yl)dimethylsilane.

$^1$H NMR (400 MHz, CDCl$_3$): δ 7.24-7.44 (m, 14H (in A and B)), 7.14-7.16 (m, 1H (in B)), 7.08-7.12 (m, 1H (in A)), 6.31-6.32 (m, 1H (in A)), 6.24-6.25 (m, 1H (in B)), 3.71-3.73 (m, 2H (in A and B)), 3.52-3.59 (m, 2H (in A and B)), 2.21-2.24 (m, 12H (in A and B)), 1.32-1.36 (m, 6H (in A and B)), 0.31 (s, 3H (in B)), 0.21 (s, 3H (in A)), −0.04 (s, 3H (in A)), −0.11 (s, 3H (in B)).

(1,3-Dimethyl-1H-inden-2-yl)dimethyl(1-phenyl-3H-cyclopenta[a]naphthalene-3-yl)silane (L97)

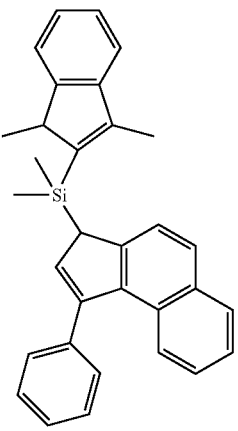 [SMILES: CC1=C([Si](C)(C)C2C=C(c3ccccc3)c3c2ccc2ccccc32)C(C)c2ccccc21]

According to the General procedure 1, 5.68 g (89%) of the title compound as a ca. 1:1 mixture of the diastereomers A and B was obtained from 3.50 g (14.4 mmol) of 1-phenyl-3H-cyclopenta[a]naphthalene in 70 ml of dry ether, 5.78 ml (14.4 mmol, 2.5 M) of n-butyllithium and 3.42 g (14.4 mmol) of chloro(1,3-dimethyl-1H-inden-2-yl)dimethylsilane.

$^1$H NMR (400 MHz, CDCl$_3$): δ 7.89 (t, 2H (in A and B), J=7.9 Hz), 7.80 (dd, 2H (in A and B), J=8.4 Hz, J=2.7 Hz), 7.20-7.71 (m, 26H (in A and B)), 6.67 (d, 1H (in B), J=1.8 Hz), 6.60 (d, 1H (in A), J=1.8 Hz), 4.16 (dd, 2H (in A and B), J=4.7 Hz, J=1.8 Hz), 3.65-3.69 (m, 2H (in A and B)), 2.32 (d, 3H (in B), J=2.0 Hz), 2.19 (d, 3H (in A), J=1.8 Hz), 1.41 (d, 3H (in A), J=7.5 Hz), 1.37 (d, 3H (in B), J=7.5 Hz), 0.40 (s, 3H (in B)), 0.36 (s, 3H (in A)), 0.04 (s, 3H (in A)), −0.02 (s, 3H (in B)).

(1,3-Dimethyl-1H-inden-2-yl)(2,4-diphenyl-1H-inden-1-yl)dimethylsilane (L118)

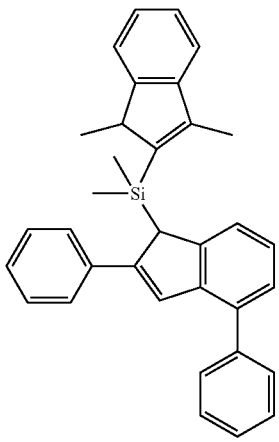 [SMILES: CC1=C([Si](C)(C)C2C(c3ccccc3)=Cc3c(-c4ccccc4)cccc32)C(C)c2ccccc21]

According to the General procedure 1, 1.10 g (67%) of the title compound as a ca. 1:1 mixture of the diastereomers A and B was obtained from 0.95 g (3.54 mmol) of 2,4-diphenyl-1H-indenein 40 ml of dry ether, 1.45 ml (3.54 mmol, 2.5 M) of n-butyllithium and 0.84 g (3.54 mmol) of chloro(1,3-dimethyl-1H-inden-2-yl)dimethylsilane.

$^1$H NMR (400 MHz, CDCl$_3$): δ 7.03-7.55 (m, 36H (in A and B)), 4.48-4.49 (m, 2H (in A and B)), 3.42-3.49 (m, 1H (in A)), 2.93-3.01 (m, 1H (in B)), 2.19 (d, 3H (in B), J=1.7 Hz), 2.08 (d, 3H (in A), J=1.7 Hz), 1.32 (d, 3H (in A), J=7.6 Hz), 1.12 (d, 3H (in B), J=7.4 Hz), 0.11 (s, 3H (in B)), 0.02 (s, 3H (in A)), −0.18 (s, 3H (in B)), −0.31 (s, 3H (in A)).

(1,3-Dimethyl-1H-inden-2-yl)dimethyl(3-methyl-2-phenyl-1H-inden-1-yl)silane (L119)

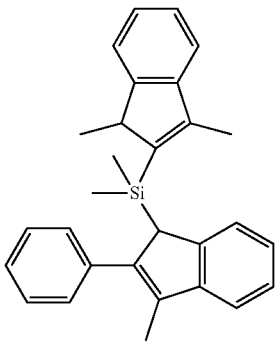 [SMILES: CC1=C([Si](C)(C)C2C(c3ccccc3)=C(C)c3ccccc32)C(C)c2ccccc21]

According to the General procedure 1, 2.70 g (92%) of the title compound as a ca. 2:3 mixture of the diastereomers A and B was obtained from 1.50 g (7.27 mmol) of 3-methyl-2-phenyl-1H-indenein 50 ml of dry ether, 3.00 ml (7.27 mmol, 2.5 M) of n-butyllithium and 1.72 g (7.27 mmol) of chloro(1,3-dimethyl-1H-inden-2-yl)dimethylsilane.

$^1$H NMR (400 MHz, CDCl$_3$): δ 7.00-7.48 (m, 26H), 4.32-4.34 (m, 1H (in B)), 4.25-4.27 (m, 1H (in A)), 3.41-3.46 (m, 1H (in A)), 3.01-3.06 (m, 1H (in B)), 2.27-2.31 (m, 12H (in A and B)), 1.39 (d, 3H (in A), J=7.8 Hz), 1.05 (d, 3H (in B), J=7.3 Hz), 0.03 (s, 3H (in B)), −0.22 (s, 3H (in A)), −0.30 (s, 3H (in B)), −0.39 (s, 3H (in A)).

(1,3-Dimethyl-1H-inden-2-yl)(4,7-dimethyl-2-phenyl-1H-inden-1-yl)dimethylsilane (L120)

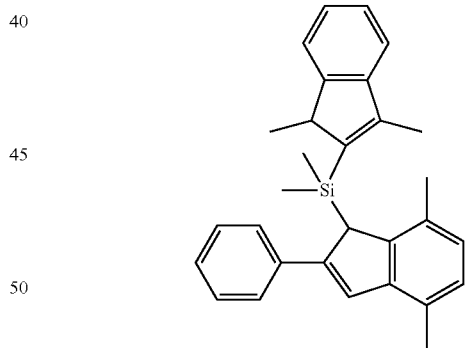

According to the General procedure 1, 1.00 g (33%) of the title compound as a ca. 1:1 mixture of the diastereomers A and B was obtained from 1.60 g (7.30 mmol) of 4,7-dimethyl-2-phenyl-1H-indenein 50 ml of dry ether, 3.00 ml (7.30 mmol, 2.5 M) of n-butyllithium and 1.72 g (7.30 mmol) of chloro(1,3-dimethyl-1H-inden-2-yl)dimethylsilane.

$^1$H NMR (400 MHz, CDCl$_3$): δ 7.57-7.59 (m, 2H (in A and B)), 6.81-7.42 (m, 22H (in A and B)), 4.54-4.57 (m, 2H (in A and B)), 3.32-3.39 (m, 1H), 2.69-2.75 (m, 1H), 2.48 (s, 6H), 2.38 (s, 3H), 2.21-2.25 (m, 3H), 2.14 (s, 3H), 1.99-2.04 (m, 3H), 1.02-1.07 (m, 3H), 0.12 (s, 3H), 0.07 (s, 3H), −0.23 (s, 3H), −0.28 (s, 3H).

(1,3-Dimethyl-1H-inden-2-yl)(2-isopropyl-1H-inden-1-yl)dimethylsilane (L121)

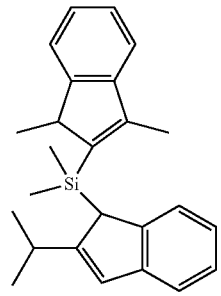 [SMILES: CC1=C([Si](C)(C)C2C(C(C)C)=Cc3ccccc32)C(C)c2ccccc21]

According to the General procedure 1, 2.10 g (98%) of the title compound as a ca. 1:1 mixture of the diastereomers A and B was obtained from 1.00 g (6.30 mmol) of 2-isopropyl-1H-indenein 50 ml of dry ether, 2.60 ml (6.30 mmol, 2.44 M) of n-butyllithium and 1.50 g (6.30 mmol) of chloro(1,3-dimethyl-1H-inden-2-yl)dimethylsilane.

$^1$H NMR (400 MHz, CDCl$_3$): δ 7.12-7.48 (m, 14H (in A and B)), 7.06 (t, 1H (in B), J=7.5 Hz), 6.96 (t, 1H (in A), J=7.4 Hz), 6.63-6.65 (m, 2H (in A and B)), 3.90-3.91 (m, 2H (in A and B)), 3.54-3.62 (m, 2H (in A and B)), 2.77-2.87 (m, 1H (in A)), 2.63-2.73 (m, 1H (in B)), 2.33 (s, 3H (in B)), 2.15 (s, 3H (in A)), 1.42 (d, 3H, J=7.4 Hz), 1.31-1.34 (m, 6H), 1.27 (d, 3H, J=6.7 Hz), 1.19 (d, 3H, J=6.9 Hz), 1.04 (d, 3H, J=6.9 Hz), 0.34 (s, 3H (in A)), 0.31 (s, 3H (in B)), −0.09 (s, 6H (in A and B)).

(1,3-Dimethyl-1H-inden-2-yl)(2-o-tolyl-1H-inden-1-yl)dimethylsilane (L122)

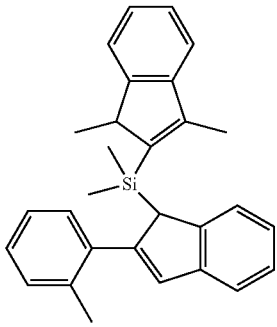 [SMILES: CC1=C([Si](C)(C)C2C(c3ccccc3C)=Cc3ccccc32)C(C)c2ccccc21]

According to the General procedure 1, 2.10 g (98%) of the title compound as a ca. 2:3 mixture of the diastereomers A and B was obtained from 1.00 g (6.30 mmol) of 2-isopropyl-1H-indenein 30 ml of dry ether, 2.60 ml (6.30 mmol, 2.44 M) of n-butyllithium and 1.50 g (6.30 mmol) of chloro(1,3-dimethyl-1H-inden-2-yl)dimethylsilane.

$^1$H NMR (400 MHz, CDCl$_3$, mixture of isomers A and B): δ 6.99-7.52 (m, 24H, (in A and B)), 6.98 (s, 1H (in A)), 6.95 (s, 1H (in B)), 4.49 (s, 1H (in B)), 4.44 (s, 1H (in A)), 3.48 (m, 1H (in A)), 3.17 (m, 1H (in B)), 2.53 (s, 3H (in A)), 2.47 (s, 3H (in B)), 2.29 (d, 3H (in B), J=1.9 Hz), 2.10 (d, 3H (in A), J=1.9 Hz), 1.71 (d, 3H (in A), J=7.5 Hz), 1.10 (d, 3H (in B), J=7.5 Hz), −0.03 (s, 3H (in B)), −0.15 (s, 3H (in A)), −0.22 (s, 3H (in B)), −0.32 (s, 3H (in A)).

(1,3-Dimethyl-1H-inden-2-yl)(2-(3,5-di-tert-butylphenyl)-1H-inden-1-yl)dimethylsilane (L125)

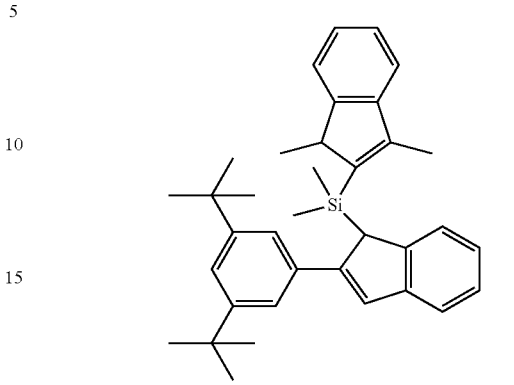

According to the General procedure 1, 1.50 g (60%) of the title compound as a ca. 2:3 mixture of the diastereomers A and B was obtained from 1.50 g (5.00 mmol) of 2-(3,5-di-tert-butylphenyl)-1H-indenein 40 ml of dry ether, 2.50 ml (5.00 mmol, 2.45 M) of n-butyllithium and 1.20 g (5.00 mmol) of chloro(1,3-dimethyl-1H-inden-2-yl)dimethylsilane.

$^1$H NMR (400 MHz, CDCl$_3$): δ 6.98-7.45 (m, 24H (in A and B)), 4.46 (s, 1H (in B)), 4.44 (s, 1H (in A)), 3.41-3.47 (m, 1H (in A)), 3.09-3.15 (m, 1H (in B)), 2.12 (d, 3H (in B), J=1.8 Hz), 2.09 (d, 3H (in A), J=1.7 Hz), 1.36 (s, 18H (in A)), 1.29 (d, 3H (in A), J=7.5 Hz), 1.36 (s, 18H (in B)), 1.17 (d, 3H (in B), J=7.5 Hz), −0.01 (s, 3H (in B)), −0.07 (s, 3H (in A)), −0.16 (s, 3H (in B)), −0.33 (s, 3H (in A)).

(1,3-Dimethyl-1H-inden-2-yl)(2-(3,5-dimethylphenyl)-1H-inden-1-yl)dimethylsilane (L127)

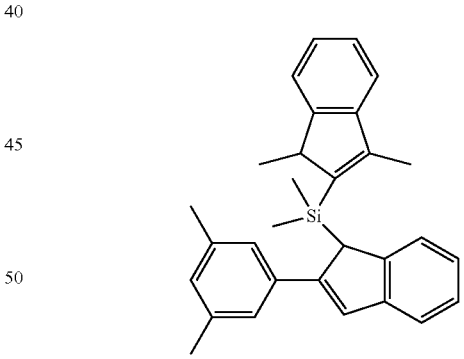

According to the General procedure 1, 1.85 g (64%) of the title compound as a ca. 1:1 mixture of the diastereomers A and B was obtained from 1.50 g (6.80 mmol) of 2-(3,5-dimethylphenyl)-1H-indenein 40 ml of dry ether, 2.80 ml (6.80 mmol, 2.45 M) of n-butyllithium and 1.60 g (6.80 mmol) of chloro(1,3-dimethyl-1H-inden-2-yl)dimethylsilane.

$^1$H NMR (400 MHz, CDCl$_3$): δ 7.43-7.46 (m, 2H (in A and B)), 7.38-7.41 (m, 2H (in A and B)), 6.98-7.34 (m, 16H (in A and B)), 6.88 (s, 1H (in A)), 6.68 (s, 1H (in B)), 4.38 (s, 2H (in A and B)), 3.42-3.48 (m, 1H (in A)), 2.89-2.95 (m, 1H (in B)), 2.31 (s, 6H (in A)), 2.22 (d, 3H (in B), J=1.7 Hz), 2.10 (d, 3H (in A), J=1.8 Hz), 2.04 (s, 6H (in B)), 1.30 (d, 3H (in A), J=7.4 Hz), 1.15 (d, 3H (in B), J=7.5 Hz), 0.19 (s, 3H (in B)), 0.05 (s, 3H (in A)), −0.27 (s, 3H (in B)), −0.28 (s, 3H (in A)).

(1,3-Dimethyl-1H-inden-2-yl)(2,3-dimethyl-1H-inden-1-yl)dimethylsilane (L128)

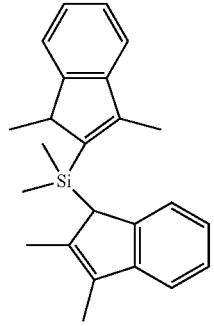 [SMILES: CC1=C([Si](C)(C)C2C(C)=C(C)c3ccccc32)C(C)c2ccccc21]

According to the General procedure 1, 2.10 g (61%) of the title compound as a ca. 2:3 mixture of the diastereomers A and B was obtained from 1.50 g (10.0 mmol) of 2,3-dimethyl-1H-indenein 50 ml of dry ether, 4.10 ml (10.0 mmol, 2.45 M) of n-butyllithium and 2.37 g (10.0 mmol) of chloro(1,3-dimethyl-1H-inden-2-yl)dimethylsilane.

$^1$H NMR (400 MHz, CDCl$_3$): δ 7.43-7.47 (m, 2H), 7.22-7.38 (m, 11H), 7.13-7.14 (m, 1H), 7.06-7.10 (m, 1H), 6.96-7.00 (m, 1H), 3.67 (s, 1H), 3.63 (s, 1H), 3.54-3.62 (m, 2H), 2.33 (s, 3H), 2.11-2.14 (m, 12H), 1.99 (s, 3H), 1.43 (d, 3H, J=7.5 Hz), 1.30 (d, 3H, J=7.4 Hz), 0.33 (s, 3H), 0.32 (s, 3H), −0.10 (s, 3H), −0.10 (s, 3H).

(1,3-Di methyl-1H-inden-2-yl)(2-ethyl-3-methyl-1H-inden-1-yl)dimethylsilane (L129)

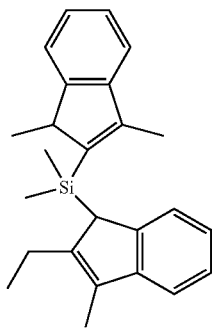 [SMILES: CCC1=C(C)c2ccccc2C1[Si](C)(C)C1=C(C)c2ccccc2C1C]

According to the General procedure 1, 2.10 g (62%) of the title compound as a ca. 1:1 mixture of the diastereomers A and B was obtained from 1.50 g (9.50 mmol) of 2-ethyl-3-methyl-1H-indenein 50 ml of dry ether, 3.90 ml (9.50 mmol, 2.45 M) of n-butyllithium and 2.25 g (9.50 mmol) of chloro(1,3-dimethyl-1H-inden-2-yl)dimethylsilane.

$^1$H NMR (400 MHz, CDCl$_3$): δ 7.43 (t, 2H, J=7.7 Hz), 7.19-7.37 (m, 11H), 7.04-7.11 (m, 2H), 6.95 (t, 1H, J=7.4 Hz), 3.79 (s, 1H), 3.77 (s, 1H), 3.50-3.57 (m, 2H (in A and B)), 2.58-2.76 (m, 2H (in A and B)), 2.34-2.43 (m, 1H (in B)), 2.28 (s, 3H (in B)), 2.19-2.27 (m, 1H (in A)), 2.11 (s, 6H (in A) and 3H (in B)), 1.38 (d, 3H (in A), J=7.5 Hz), 1.27 (d, 3H (in B), J=6.9 Hz), 1.13 (t, 3H (in A), J=7.5 Hz), 0.97 (t, 3H (in B), J=7.4 Hz), 0.31 (s, 3H (in A)), 0.26 (s, 3H (in B)), −0.13 (s, 3H (in B)), −0.17 (s, 3H (in A)).

(1,3-Dimethyl-1H-inden-2-yl)dimethyl(2-phenyl-3H-cyclopenta[a]naphthalene-3-yl)silane (L144)

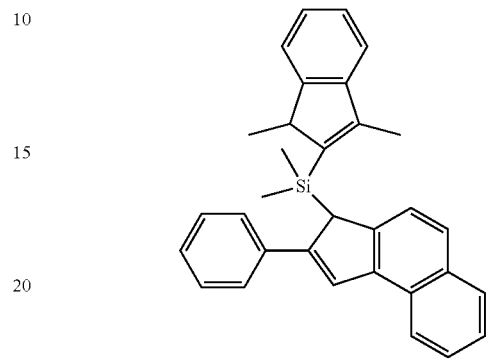

According to the General procedure 1, 0.70 g (39%) of the title compound as a ca. 1:1 mixture of the diastereomers A and B was obtained from 1.00 g (4.10 mmol) of 2-phenyl-3H-cyclopenta[a]naphthalenein 40 ml of dry ether, 1.70 ml (4.10 mmol, 2.45 M) of n-butyllithium and 0.97 g (4.10 mmol) of chloro(1,3-dimethyl-1H-inden-2-yl)dimethylsilane.

$^1$H NMR (400 MHz, CDCl$_3$): δ 8.23 (d, 2H, J=8.1 Hz), 7.87 (t, 2H, J=8.8 Hz), 7.75 (d, 2H, J=3.8 Hz), 7.64 (d, 2H, J=7.2 Hz), 7.09-7.59 (m, 24H), 4.67 (s, 1H), 4.65 (s, 1H), 3.44-3.57 (m, 1H (in A)), 3.01-3.07 (m, 1H (in B)), 2.24 (d, 3H (in B), J=1.7 Hz), 2.09 (d, 3H (in A), J=1.7 Hz), 1.37 (d, 3H (in A), J=7.5 Hz), 1.14 (d, 3H (in B), J=7.5 Hz), 0.08 (s, 3H (in B)), −0.01 (s, 3H (in A)), −0.25 (s, 3H (in B)), −0.40 (s, 3H (in A)).

Catalyst 92

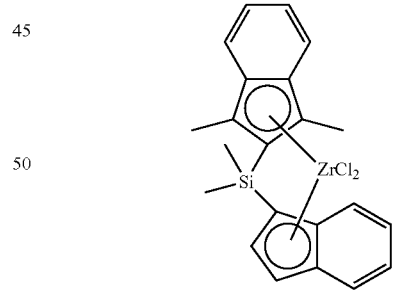

According to the General procedure 2, 5.00 g (61%) of the title compound was obtained from 5.50 g (17.4 mmol) of L92 in 150 ml of dry ether, 13.9 ml (34.8 mmol, 2.5 M) of n-butyllithium, and 4.05 g (17.4 mmol) of zirconium tetrachloride.

$^1$H NMR (400 MHz, CD$_2$Cl$_2$): δ 7.70 (dd, 1H, J=8.7 Hz, J=1.0 Hz), 7.55 (d, 1H, J=8.5 Hz), 7.47 (d, 1H, J=8.5 Hz), 7.42 (d, 1H, J=8.5 Hz), 7.31-7.35 (m, 1H), 7.25-7.29 (m, 1H), 7.14-7.22 (m, 2H), 7.09 (m, 1H), 6.24 (d, 1H, J=3.4 Hz), 2.47 (s, 3H), 2.35 (s, 3H), 1.27 (s, 3H), 1.09 (s, 3H).

Catalyst 93

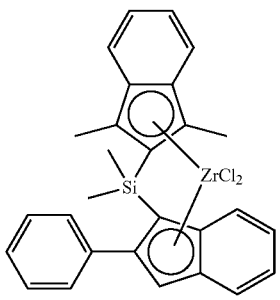

According to the General procedure 2, 4.90 g (63%) of the title compound was obtained from 5.10 g (13.0 mmol) of L93 in 200 ml of dry ether, 10.4 ml (26.0 mmol, 2.5 M) of n-butyllithium, and 3.03 g (13.0 mmol) of zirconium tetrachloride. The product contained 0.5 equiv of cocrytallized toluene.

$^1$H NMR (400 MHz, CD$_2$Cl$_2$): δ 7.91 (dd, 1H, J=8.8 Hz, J=0.9 Hz), 7.78-7.80 (m, 2H), 7.54 (d, 1H, J=8.5 Hz), 7.10-7.47 (m, 9H+5H in toluene), 7.00 (s, 1H), 2.37 (s, 3H), 2.34 (s, 3H in toluene), 1.76 (s, 3H), 1.35 (s, 3H), 0.89 (s, 3H).

Catalyst 94

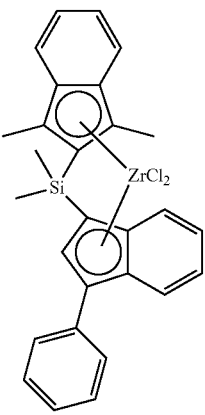

According to the General procedure 2, 3.65 g (56%) of the title compound was obtained from 4.65 g (11.8 mmol) of L94 in 200 ml of dry ether, 9.50 ml (23.6 mmol, 2.5 M) of n-butyllithium, and 2.76 g (11.8 mmol) of zirconium tetrachloride.

$^1$H NMR (400 MHz, CD$_2$Cl$_2$): δ 7.80 (dd, 2H, J=8.8 Hz, J=4.3 Hz), 7.18-7.49 (m, 11H), 6.20 (s, 1H), 2.45 (s, 3H), 2.39 (s, 3H), 1.33 (s, 3H), 1.10 (s, 3H).

Catalyst 95

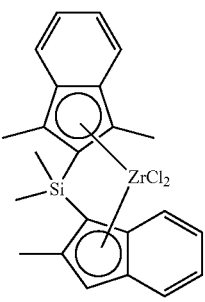

According to the General procedure 2, 3.60 g (48%) of the title compound was obtained from 5.10 g (15.0 mmol) of L95 in 200 ml of dry ether, 12.4 ml (30.0 mmol, 2.5 M) of n-butyllithium, and 3.50 g (15.0 mmol) of zirconium tetrachloride.

$^1$H NMR (400 MHz, CD$_2$Cl$_2$): δ 7.83 (d, 1H, J=8.7 Hz), 7.56 (d, 1H, J=8.5 Hz), 7.46 (d, 1H, J=8.5 Hz), 7.09-7.31 (m, 5H), 6.74 (s, 1H), 2.59 (s, 3H), 2.42 (s, 3H), 2.36 (s, 3H), 1.30 (s, 3H), 1.20 (s, 3H).

Catalyst 96

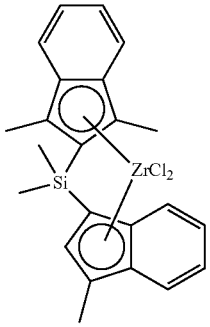

According to the General procedure 2, 3.40 g (53%) of the title compound was obtained from 4.30 g (13.0 mmol) of L96 in 200 ml of dry ether, 10.4 ml (26.0 mmol, 2.5 M) of n-butyllithium, and 3.03 g (13.0 mmol) of zirconium tetrachloride.

$^1$H NMR (400 MHz, CD$_2$Cl$_2$): δ 7.65 (d, 1H, J=8.9 Hz), 7.48 (d, 1H, J=8.7 Hz), 7.40-7.43 (m, 2H), 7.10-7.33 (m, 4H), 5.80 (s, 1H), 2.39 (s, 3H), 2.39 (s, 3H), 2.38 (s, 3H), 1.27 (s, 3H), 1.04 (s, 3H).

Catalyst 97

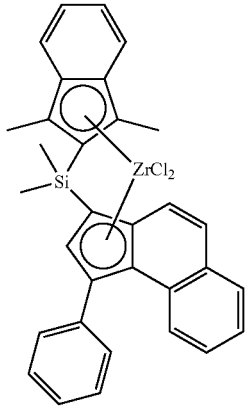

According to the General procedure 2, 4.30 g (55%) of the title compound was obtained from 5.30 g (12.0 mmol) of L97 in 200 ml of dry ether, 9.60 ml (24.0 mmol, 2.5 M) of n-butyllithium, and 2.80 g (12.0 mmol) of zirconium tetrachloride. The product contained 0.5 equiv of cocrytallized toluene.

$^1$H NMR (400 MHz, CD$_2$Cl$_2$): δ 8.10 (d, 1H, J=8.3 Hz), 7.78 (d, 1H, J=7.7 Hz), 7.58-7.63 (m, 3H), 7.39-7.52 (m, 7H), 7.13-7.32 (m, 3H+5H in toluene), 6.12 (s, 1H), 2.49 (s, 3H), 2.47 (s, 3H), 2.34 (s, 3H in toluene), 1.33 (s, 3H), 1.09 (s, 3H).

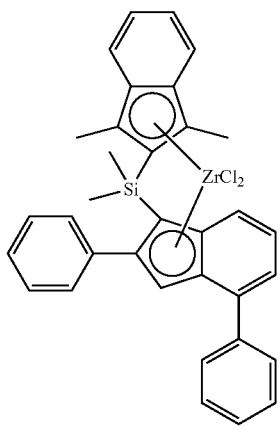

Catalyst 118

According to the General procedure 2, 0.75 g (50%) of the title compound was obtained from 1.10 g (2.50 mmol) of L118 in 40 ml of dry ether, 2.00 ml (5.00 mmol, 2.5 M) of n-butyllithium, and 0.58 g (2.50 mmol) of zirconium tetrachloride.

$^1$H NMR (400 MHz, CDCl$_3$): δ 7.86 (d, 1H, J=8.6 Hz), 7.75 (d, 2H, J=6.4 Hz), 7.54 (d, 2H, J=7.1 Hz), 7.47 (t, 2H, J=8.5 Hz), 7.16-7.38 (m, 10H), 7.07 (s, 1H), 2.42 (s, 3H), 1.81 (s, 3H), 1.37 (s, 3H), 0.89 (s, 3H).

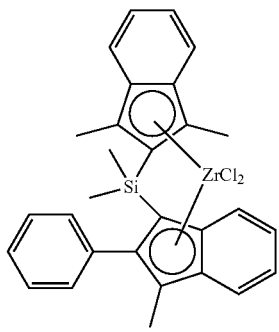

Catalyst 119

According to the General procedure 2, 1.60 g (46%) of the title compound was obtained from 2.50 g (6.10 mmol) of L119 in 40 ml of dry ether, 4.90 ml (12.2 mmol, 2.5 M) of n-butyllithium, and 1.43 g (6.10 mmol) of zirconium tetrachloride.

$^1$H NMR (400 MHz, CDCl$_3$): δ 7.86 (d, 1H, J=8.9 Hz), 7.49 (d, 1H, J=8.4 Hz), 7.21-7.44 (m, 10H), 7.08-7.12 (m, 1H), 2.40 (s, 3H), 2.28 (s, 3H), 1.84 (s, 3H), 1.33 (s, 3H), 0.61 (s, 3H).

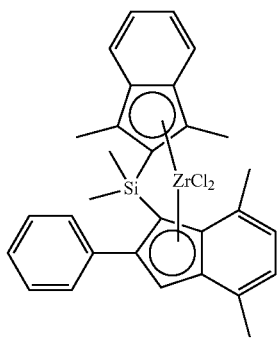

Catalyst 120

According to the General procedure 2, 0.25 g (18%) of the title compound was obtained from 1.05 g (2.50 mmol) of L120 in 40 ml of dry ether, 2.00 ml (5.00 mmol, 2.5 M) of n-butyllithium, and 0.58 g (2.50 mmol) of zirconium tetrachloride.

$^1$H NMR (400 MHz, CDCl$_3$): δ 7.92 (br.s, 1H), 7.46 (d, 2H, J=8.9 Hz), 7.17-7.45 (m, 6H), 7.00 (s, 1H), 6.97 (d, 1H, J=7.1 Hz), 6.89 (d, 1H, J=6.9 Hz), 2.69 (s, 3H), 2.27 (s, 3H), 2.27 (s, 3H), 1.98 (s, 3H), 1.21 (s, 3H), 0.63 (s, 3H).

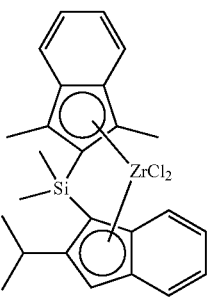

Catalyst 121

According to the General procedure 2, 1.20 g (41%) of the title compound was obtained from 2.00 g (5.60 mmol) of L121 in 50 ml of dry ether, 4.40 ml (11.2 mmol, 2.5 M) of n-butyllithium, and 1.30 g (5.60 mmol) of zirconium tetrachloride.

$^1$H NMR (400 MHz, CDCl$_3$): δ 7.77 (d, 1H, J=8.9 Hz), 7.49 (d, 1H, J=14.3 Hz), 7.47 (d, 1H, J=14.5 Hz), 7.19-7.36 (m, 4H), 7.04-7.08 (m, 1H), 6.88 (s, 1H), 3.21-3.30 (m, 1H), 2.51 (s, 3H), 2.35 (s, 3H), 1.43 (d, 3H, J=6.7 Hz), 1.29 (s, 3H), 1.19-1.20 (m, 6H).

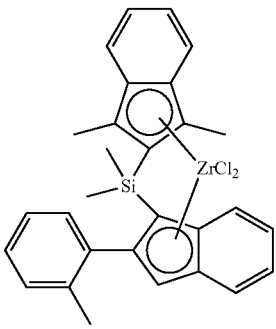

Catalyst 122

According to the General procedure 2, 1.30 g (43%) of the title compound was obtained from 2.20 g (5.40 mmol) of L122 in 50 ml of dry ether, 4.30 ml (10.8 mmol, 2.5 M) of n-butyllithium, and 1.26 g (5.40 mmol) of zirconium tetrachloride.

$^1$H NMR (400 MHz, CDCl$_3$): δ 7.98 (d, 1H, J=7.1 Hz), 7.82 (d, 1H, J=8.6 Hz), 7.53 (d, 1H, J=14.3 Hz), 7.51 (d, 1H, J=14.5 Hz), 7.41 (d, 1H, J=8.6 Hz), 7.20-7.36 (m, 6H), 7.08-7.12 (m, 1H), 6.83 (s, 1H), 2.39 (s, 3H), 2.17 (s, 3H), 2.06 (s, 3H), 1.27 (s, 3H), 0.57 (s, 3H).

Catalyst 125

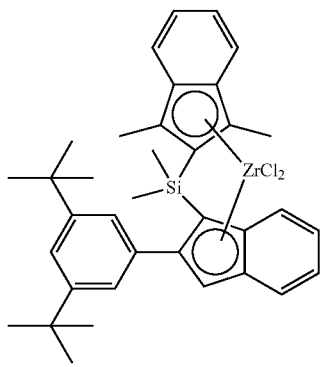

According to the General procedure 2, 0.55 g (33%) of the title compound was obtained from 1.50 g (2.97 mmol) of L125 in 50 ml of dry ether, 2.40 ml (5.90 mmol, 2.5 M) of n-butyllithium, and 0.69 g (2.97 mmol) of zirconium tetrachloride.

$^1$H NMR (400 MHz, CDCl$_3$): δ 7.86 (d, 1H, J=8.8 Hz), 7.52 (d, 1H, J=8.5 Hz), 7.42-7.45 (m, 3H), 7.09-7.34 (m, 6H), 7.01 (s, 1H), 2.37 (s, 3H), 1.80 (s, 3H), 1.37 (s, 18H), 1.33 (s, 3H), 0.83 (s, 3H).

Catalyst 127

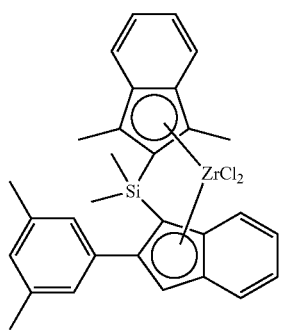

According to the General procedure 2, 1.20 g (47%) of the title compound was obtained from 1.85 g (4.40 mmol) of L127 in 50 ml of dry ether, 3.60 ml (8.80 mmol, 2.5 M) of n-butyllithium, and 1.00 g (4.40 mmol) of zirconium tetrachloride.

$^1$H NMR (400 MHz, CDCl$_3$): δ 7.52 (d, 1H, J=8.5 Hz), 7.39-7.44 (m, 4H), 7.17-7.34 (m, 4H), 7.07-7.12 (m, 1H), 7.02 (s, 1H), 7.00 (s, 1H), 2.36-2.37 (m, 9H), 1.78 (s, 3H), 1.33 (s, 3H), 0.88 (s, 3H).

Catalyst 128

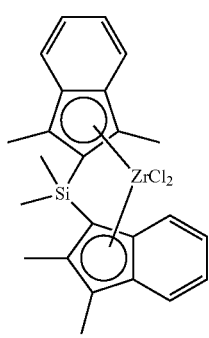

According to the General procedure 2, 1.20 g (39%) of the title compound was obtained from 2.10 g (6.00 mmol) of L128 in 50 ml of dry ether, 5.00 ml (12.0 mmol, 2.5 M) of n-butyllithium, and 1.42 g (6.00 mmol) of zirconium tetrachloride.

$^1$H NMR (400 MHz, CDCl$_3$): δ 7.79 (d, 1H, J=8.7 Hz), 7.58 (d, 1H, J=8.1 Hz), 7.14-7.40 (m, 5H), 7.04-7.08 (m, 1H), 2.50 (s, 3H), 2.39 (s, 3H), 2.27 (s, 3H), 2.22 (s, 3H), 1.30 (s, 3H), 1.18 (s, 3H).

Catalyst 129

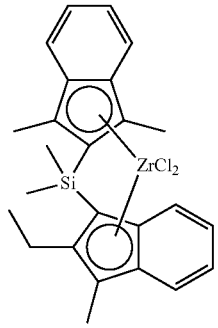

According to the General procedure 2, 1.23 g (41%) of the title compound was obtained from 2.10 g (5.85 mmol) of L129 in 50 ml of dry ether, 4.70 ml (11.7 mmol, 2.5 M) of n-butyllithium, and 1.36 g (5.85 mmol) of zirconium tetrachloride.

$^1$H NMR (400 MHz, CDCl$_3$): δ 7.84 (d, 1H, J=8.8 Hz), 7.61 (d, 1H, J=8.1 Hz), 7.42-7.44 (m, 2H), 7.21-7.37 (m, 4H), 7.09-7.13 (m, 1H), 2.55-2.73 (m, 2H), 2.52 (s, 3H), 2.42 (s, 3H), 2.31 (s, 3H), 1.34 (s, 3H), 1.19 (s, 3H), 1.10 (t, 3H, J=7.5 Hz).

Catalyst 144

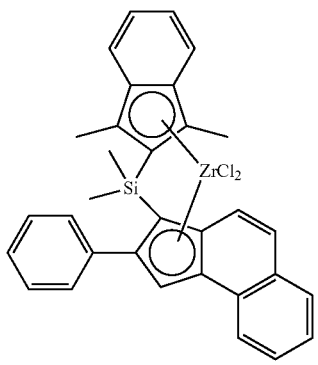

According to the General procedure 2, 2.49 g (57%) of the title compound was obtained from 3.20 g (7.22 mmol) of L144 in 60 ml of dry ether, 5.8 ml (14.4 mmol, 2.5 M) of n-butyllithium, and 1.68 g (7.22 mmol) of zirconium tetrachloride.

$^1$H NMR (400 MHz, CDCl$_3$): δ 7.97 (d, 1H, J=7.9 Hz), 7.82 (d, 2H, J=7.1 Hz), 7.73-7.77 (m, 2H), 7.38-7.53 (m, 9H), 7.24-7.27 (m, 1H), 7.13-7.17 (m, 1H), 2.42 (s, 3H), 1.81 (s, 3H), 1.37 (s, 3H), 0.91 (s, 3H).

Catalyst 130 was prepared in a method analogous to the method as disclosed in Macromolecules 2004 (Waymouth et al.)

Polymerizations

The reactivity of a catalyst towards the comonomer 1-hexene is expressed as the mol percentage of hexene incorporated in the copolymer per volume percentage of hexene loading in the reactor-cells of the PPR. A high ratio of incorporated hexene:loaded hexene indicates a high reactivity of the catalyst towards comonomer, which is advantageous for commercial applications and also indicates that this catalyst is more prone to generate long-chain-branched polymers through re-insertion of vinyl terminated polymer chains. The value presented is the averaged value from the experiments with different hexene loadings to the reactor.

The catalyst activity is expressed as kg polymer per mmol catalyst per mol ethylene in the diluent per hour.

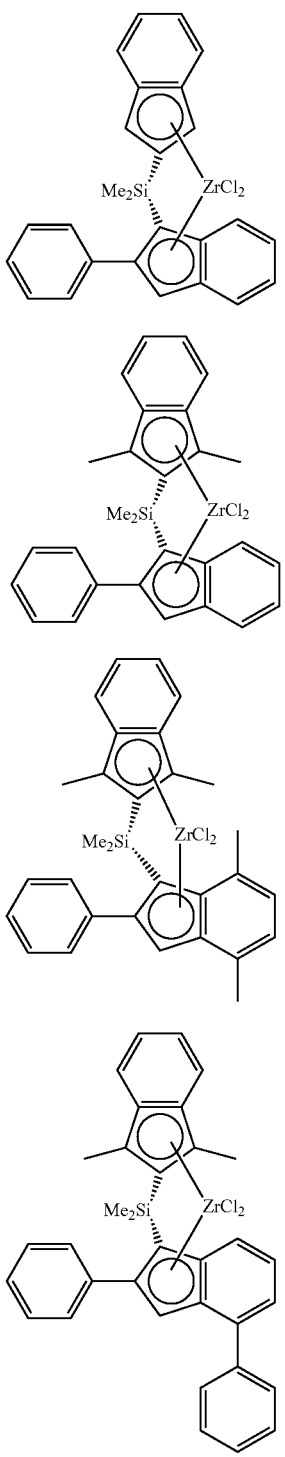

130

93

120

118

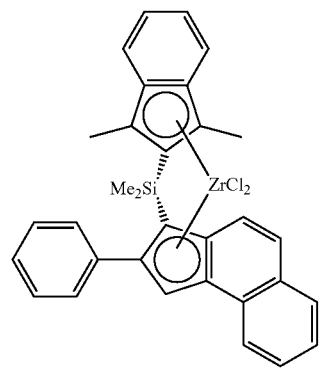

144

PPR results

| CAT ID# | C6 loading [vol %] | Rp [kg mmol$_{cat}^{-1}$ [C$_2$H$_4$]$^{-1}$h$^{-1}$] | Mw [KDa] | MWD [-] | C6 inc. [mol %] | C6 reactivity [mol %/vol %] |
|---|---|---|---|---|---|---|
| 130 Comparative | 0 | 359 | — | — | — | 1.5 |
| | 1 | 1231 | 195 | 2, 2 | 1, 5 | |
| | 2 | 884 | 167 | 2 | 3, 1 | |
| 93 | 0 | 500 | — | — | — | 1.9 |
| | 2 | 857 | 181 | 2, 8 | 4 | |
| | 5 | 642 | 105 | 3 | 9, 2 | |
| 120 | 0 | 1729 | — | — | — | 2.1 |
| | 2 | 1154 | 284 | 3, 5 | 4, 9 | |
| | 5 | 1460 | 304 | 2, 8 | 9, 2 | |
| 118 | 0 | 519 | — | — | — | 2.3 |
| | 1 | 870 | 328 | 2, 6 | 2, 6 | |
| | 2 | 920 | 288 | 2, 6 | 5 | |
| 144 | 0 | 501 | — | — | — | 2.1 |
| | 1 | 1410 | 345 | 2, 1 | 2, 5 | |
| | 10 | 808 | 99 | 2, 3 | 17, 6 | |

Comparative catalyst 130 has been described in Macromolecules 2004, 37, 2342-2347 (Reybuck and Waymouth). The inventive catalysts display better hexene reactivity compared to the comparative catalyst 130. When comparing the molecular weight of copolymers at similar comonomer content, for example at around 3 mol % hexene incorporation, the inventive catalysts make higher molecular weight copolymers.

Comparative Examples

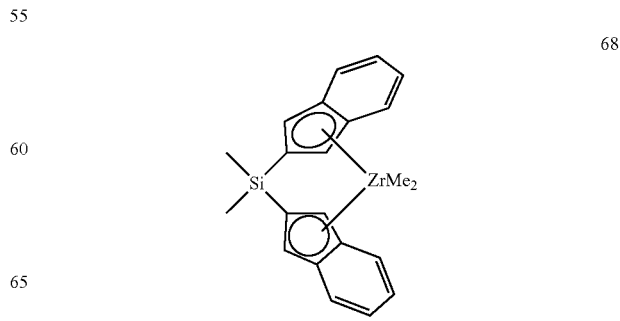

68

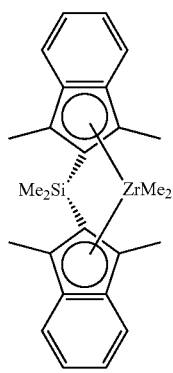

81

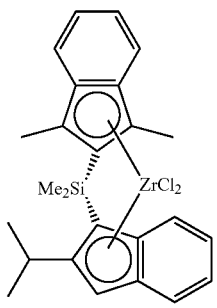

121

| | | PPR results | | | | |
|---|---|---|---|---|---|---|
| CAT ID# | C6 loading [vol %] | Rp [kg mmol$_{cat}^{-1}$ [C$_2$H$_4$]$^{-1}$h$^{-1}$] | Mw [KDa] | MWD [-] | C6 inc. [mol %] | C6 reactivity [mol %/vol %] |
| 68 | 0 | 671 | — | — | — | 0.15 |
| Comparative | 10 | 704 | 6 | 2 | 1, 5 | |
| | 40 | 150 | 6 | 2 | 5, 8 | |
| 81 comparative | 0 | 6200 | — | — | — | 0.14 |
| | 10 | 4100 | 17 | 2 | 1, 5 | |
| | 40 | 1780 | 17 | 2 | 5, 6 | |

Comparative catalyst 68 has been described in WO94/11406 example X. This catalyst results in very low molecular weight polymers and displays very low reactivity for comonomer. Comparative catalyst 81 contains a bis(1,3-dimethyl-2-indenyl) ligand, but the improvement in molecular weight is only very modest, whereas the comonomer reactivity remains very low.

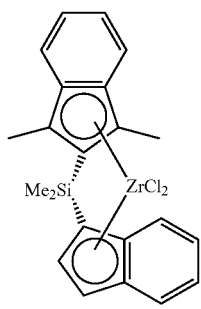

92

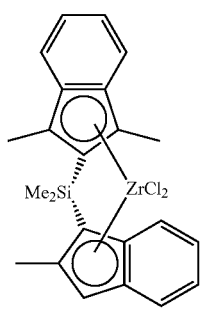

95

93

| | | PPR results | | | | |
|---|---|---|---|---|---|---|
| CAT ID# | C6 loading [vol %] | Rp [kg mmol$_{cat}^{-1}$ [C$_2$H$_4$]$^{-1}$h$^{-1}$] | Mw [KDa] | MWD [-] | C6 inc. [mol %] | C6 reactivity [mol %/vol %] |
| 92 comparative | 0 | 2929 | — | — | — | 1.0 |
| | 5 | 2030 | 15 | 2 | 5 | |
| 95 | 0 | 3007 | — | — | — | 0.7 |
| | 5 | 2556 | 28 | 2, 1 | 3, 3 | |
| 121 | 0 | 2016 | — | — | — | 1.7 |
| | 2 | 2304 | 142 | 2, 3 | 3, 6 | |
| | 5 | 1387 | 111 | 2, 1 | 7, 6 | |
| 93 | 0 | 500 | — | — | — | 1.9 |
| | 2 | 857 | 181 | 2, 8 | 4 | |
| | 5 | 642 | 105 | 3 | 9, 2 | |

Catalyst 95 results already in some improvement in molecular weight. Cat 93 and 121 result in significantly increased molecular weight and comonomer reactivity.

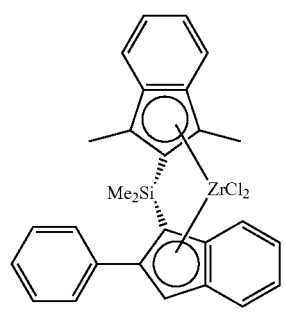

93

-continued

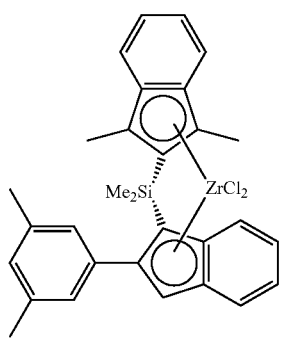

127

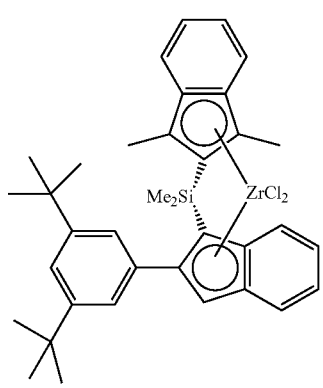

125

| CAT ID# | C6 loading [vol %] | Rp [kg mmol$_{cat}^{-1}$ [C$_2$H$_4$]$^{-1}$h$^{-1}$] | Mw [KDa] | MWD [-] | C6 inc. [mol %] | C6 reactivity [mol %/vol %] |
|---|---|---|---|---|---|---|
| 93 | 0 | 500 | — | — | — | 1.9 |
|  | 2 | 857 | 181 | 2, 8 | 4 |  |
|  | 5 | 642 | 105 | 3 | 9, 2 |  |
| 127 | 0 | 505 | — | — | — | 2.4 |
|  | 1 | 754 | 234 | 2, 3 | 2, 5 |  |
|  | 2 | 564 | 181 | 2, 3 | 4, 5 |  |
|  | 5 | 240 | 96 | 2 | 9, 4 |  |
| 125 | 0 | 343 | — | — | — | 2.5 |
|  | 1 | 812 | 240 | 2, 1 | 2, 6 |  |
|  | 2 | 699 | 163 | 2, 4 | 4, 9 |  |
|  | 5 | 209 | 85 | 2, 3 | 9, 9 |  |

PPR results

Substitution at the 3,5-position of the phenyl group on the 2-position of the 1-indenyl group further enhances the comonomer reactivity.

The invention claimed is:
1. A metallocene complex according to formula (A):

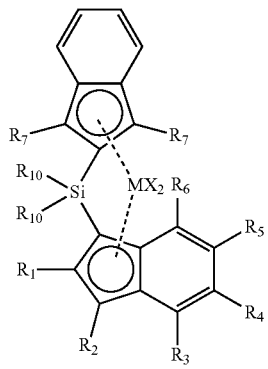

wherein R1 is selected from C1-C10 alkyl, C6-C20 aryl, or C7-C20 aralkyl groups;
wherein R2 is selected from H, C1-C10 alkyl, or C6-C10 aryl;
wherein R3 is H or C1-C10 alkyl;
wherein R4-R6 and R10 are independently selected from H, C1-C10 alkyl, or C6-C10 aryl, and wherein R3 and R4, R4 and R5, or R5 and R6 are optionally connected to form a ring structure;
wherein M is selected from Ti, Zr, or Hf, and X is an anionic ligand to M; and
wherein each R7 is independently selected from C1-C6 alkyl groups.

2. A metallocene complex according to claim 1 wherein the complex is according to formula I,

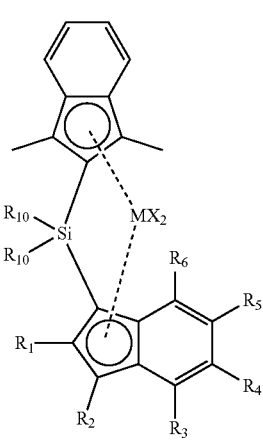

(I)

wherein R1 is selected from C1-C10 alkyl, C6-C20 aryl, or C7-C20 aralkyl groups;
wherein R2 is selected from H or C1-C10 alkyl;
wherein R3 is H or C1-C10 alkyl;
wherein R4-R6 and R10 are independently selected from H, C1-C10 alkyl, or C6-C10 aryl, and R3 and R4, R4 and R5, or R5 and R6 are optionally connected to form a ring structure; and
wherein M is selected from Ti, Zr, or Hf, and X is an anionic ligand to M.

3. The metallocene complex according to claim 1, wherein M is chosen from Zr or Hf.

4. The metallocene complex according to claim 1, wherein X is a methyl group, Cl, Br or I.

5. The metallocene complex according to claim 1, wherein R10 is a methyl group.

6. The metallocene complex according to claim 1, wherein R1 is selected from methyl, ethyl, propyl, isopropyl, butyl, isobutyl, phenyl, or 3,5-dialkyl-1-phenyl; and wherein R2 is H.

7. The metallocene complex according to claim 1, wherein R3 is chosen from H, methyl, ethyl, propyl, or isopropyl, or R3 and R4 are connected to form a ring structure.

8. The metallocene complex according to claim 1, wherein R3 is H or a methyl group, or R3 and R4 are connected to form a 6-membered aromatic ring structure.

9. The metallocene complex according to claim 1, wherein R4 is H, or forms a ring structure together with R3 and the carbon atoms of the 1-indenyl group to which R3 and R4 are attached, and wherein R5 and R6 are each independently H, or a C1-C4 alkyl group.

10. A metallocene complex having a structure (II):

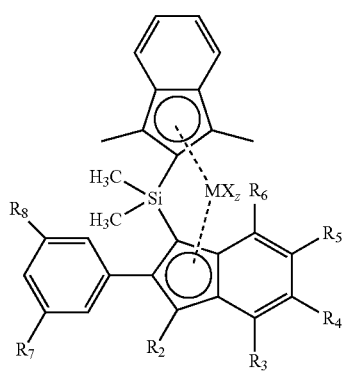

(II)

wherein R2 is H, R7 and R8 are chosen from H, methyl, isopropyl or tertiary butyl,
wherein
(i) R3-R6 are chosen from H, a methyl group, or a phenyl group, or
(ii) R3 and R4 are connected to form a six membered ring structure, and R5 and R6 are independently H or a methyl group, and
wherein M is selected from Ti, Zr, or Hf, X is an anionic ligand to M, and
z is the number of X groups and equals the valence of M minus 2.

11. The metallocene complex according to claim 1, wherein the metallocene complex has structure according to formula (III),

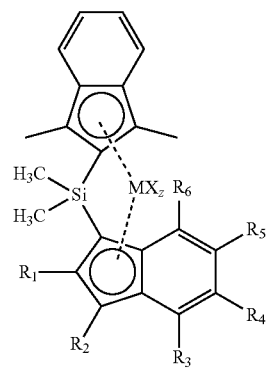

(III)

wherein R1 is chosen from methyl, ethyl, propyl, or isopropyl, and
(i) R3 is H or a methyl group, R4-R6 are chosen from H, a methyl group, or a phenyl group or
(ii) R3 and R4 are connected to form a six membered ring structure, and R5 and R6 are each independently H, a methyl group, or a phenyl group.

12. A catalyst comprising the metallocene complex according to claim 1 and a cocatalyst.

13. The catalyst of claim 1, wherein the cocatalyst includes aluminium- or boron-containing cocatalysts.

14. A process for the preparation of olefin polymers, the process comprising polymerizing one or more olefins in the presence of a cocatalyst and the metallocene complex according to claim 1, wherein the metallocene complex optionally is immobilized on a support.

15. An article comprising the polyolefins obtainable by the process according to claim 14.

16. The metallocene complex of claim 1, wherein R2 is selected from H or C1-C10 alkyl.

17. The metallocene complex of claim 1, wherein X is a methyl group or Cl.

18. The metallocene complex of claim 1,
wherein R1 is chosen from methyl, ethyl, propyl, or isopropyl,
wherein
(i) R3 is chosen from H or a methyl group, R4-R6 are H, or
(ii) R3 and R4 are connected to form a six membered ring structure, and R5 and R6 are independently H or a methyl group, and
wherein M is Zr or Hf, X is a methyl group, Cl, Br or I, and R10 is a methyl group.

19. A catalyst comprising the metallocene complex according to claim 10 and a cocatalyst.

20. The catalyst of claim 19, wherein the cocatalyst includes aluminium- or boron-containing cocatalysts.

* * * * *